2,999,005
PROCESS FOR THE PRODUCTION OF CALCIUM ALUMINUM HYDRIDE

John B. Conn, Westfield, N.J., and Robert C. Taylor, Fresh Meadows, N.Y., assignors to Merck & Co., Inc., Rahway, N.J., a corporation of New Jersey
No Drawing. Filed Mar. 7, 1958, Ser. No. 719,752
3 Claims. (Cl. 23—14)

This invention relates to a practical process for the manufacture of calcium aluminum hydride in a form suitable for use as a reducing agent.

In accordance with a prior art procedure, calcium aluminum hydride was prepared by refluxing a suspension of calcium hydride in a tetrahydrofuran solution of aluminum chloride for several hours. The solution was filtered from calcium chloride and excess calcium hydride, and the calcium aluminum hydride tetrahydrofuranate was recovered by evaporation of the filtrate.

In practical application this prior procedure presented several major problems. The primary problem involved the thickening of the calcium hydride-aluminum chloride-tetrahydrofuran mixture. This thickening becomes extreme to the point of solidification. It is believed that several factors contribute to this thickening or solidification of the reaction mixture. The primary cause of the thickening is that the reaction of calcium hydride and aluminum chloride results in the formation of some calcium chloride. It is known that this calcium chloride forms a coating on the calcium hydride thus inactivating a portion of the calcium hydride. In addition, a complex of calcium aluminum chloride [$Ca(AlCl_4)_2$] or some intermediate between calcium chloride and calcium aluminum hydride may separate during the reaction and this would tend to thicken the mixture. It has also been observed that aluminum chloride dissolves in tetrahydrofuran with the evolution of extreme heat, since it forms a complex with the etheral oxygen. The tetrahydrofuran becomes dark-colored and viscous if care is not taken to keep the temperature down. This results from cleavage of the ether link and irreversible loss of aluminum chloride at high temperature.

It is an object of this invention to provide a process for the manufacture of calcium aluminum hydride employing calcium hydride and aluminum chloride in a solvent mixture of tetrahydrofuran and a fluidizing agent which novel process avoids the thickening or solidification of the reaction mixture.

Regarded in certain of its broader aspects, our novel process involves reacting aluminum chloride and calcium hydride in a solvent mixture of tetrahydrofuran and diethylene glycol dimethyl ether in the presence of a catalyst of metal aluminum hydride and iodine, and maintaining the mixture at reflux temperature to form calcium aluminum hydride.

Any of the commercial grades of aluminum chloride and calcium hydride can be employed in this novel process, however, both the aluminum chloride and calcium hydride must be protected from exposure to moisture in order to obtain best results. It has also been found that higher yields can be obtained where the calcium hydride is of fine texture, for example, −100 mesh.

The ratio of the reactants, calcium hydride and aluminum chloride, can be varied from one part to forty parts calcium hydride to one part aluminum chloride. The ratio of the reactants is dependent upon the particular use to which the calcium aluminum hydride reducing agent is to be put. As an illustration of this, best results for the generation of silicon halides to silane were obtained where ten parts calcium hydride was reacted with one part aluminum chloride. This 10:1 ratio has proved best from the standpoint of yield and requires less aluminum chloride. It has been found that when the ratio exceeds four parts of calcium hydride to one part of aluminum chloride, the reaction frequently becomes quite vigorous and cooling is necessary.

The solvent medium employed in this novel reaction comprises tetrahydrofuran and diethylene glycol dimethyl ether. We have found that the presence of diethylene glycol dimethyl ether acts as a fluidizing agent and prevents thickening of the calcium-hydride-aluminum-chloride-tetrahydrofuran mixture. The fluidizing effect of diethylene glycol dimethyl ether appears to be related to the form in which the by-product calcium chloride separates from the reaction mixture. It may be that the separation of a complex of calcium aluminum chloride [$Ca(AlCl_4)_2$] or some intermediate between calcium chloride and calcium aluminum hydride causes the thickening in the absence of diethylene glycol dimethyl ether. Substitution of the diethylene glycol dimethyl ether component with solvents such as triethylamine, dioxane, and isopropyl ether results either in low yields or thickening of the reaction mixture. These components can be present in any ratio; however, the most suitable ratio was found to be 75% tetrahydrofuran and 25% diethylene glycol dimethyl ether.

To the solvent solution is added the catalyst for the reaction: metal aluminum hydride and iodine used in combination. The metal aluminum hydride serves the purpose of ridding the solvent of the last traces of moisture. The amounts employed are approximately 0.1% lithium aluminum hydride or a few milliliters of calcium aluminum hydride solution from a previous batch and approximately 1.0% iodine based on the amount of calcium hydride used. These percentages are flexible ranging from 0.1% to 1.0% for lithium aluminum hydride and from 1.0% to 5.0% for iodine. The absence of either of these catalysts lowers the yields from 20% to 80% depending on the ratio of calcium hydride and aluminum chloride $Al_2Cl_6$ being used.

The time of the reaction has been varied from one-half hour to eight hours. It has been found that the reaction is complete by the end of one hour, and further reaction time usually decreases the yield. By the end of one hour, the suspension has gone from pale gray to a slate grey color, and the refluxing has subsided to a slow rate.

In accordance with one method of carrying out this invention, the solvent is prepared consisting of 75% tetrahydrofuran and 25% diethylene glycol dimethyl ether. The lithium aluminum hydride is added to the solvent to remove any last traces of moisture and then the iodine is added to the solvent.

When the iodine has completely dissolved, the calcium hydride is added and then aluminum chloride is added slowly. The reaction is exothermic and a slow reflux may begin. The mixture is then heated to reflux until completion of the reaction. The solvent can be removed and calcium aluminum hydride powder recovered, although this is not necessary for most purposes.

It is also possible to reverse the procedure by adding aluminum chloride prior to the addition of the calcium hydride. Lithium aluminum hydride is added to the 75% tetrahydrofuran–25% diethylene glycol dimethyl ether solvent to remove any last traces of moisture. The aluminum chloride is then added slowly, the iodine is added, followed by the addition of calcium hydride. The mixture is then refluxed to form calcium aluminum hydride.

The calcium aluminum hydride thus obtained can be employed as a reducing agent for aldehydes, ketones, acid chlorides and in the reduction of esters to alcohols, nitriles to amines, and aromatic nitro compounds to azo compounds, as for example, in the reduction of benzaldehyde to benzyl alcohol.

To a clearer understanding of the invention, the following examples are given. These examples are merely illustrative and are not to be taken as in limitation of the invention.

*Example 1*

Tetrahydrofuran was distilled under nitrogen once from sodium and then from calcium hydride and then stored over calcium hydride. Diethylene glycol dimethyl ether was distilled in the same manner, namely, under nitrogen once from sodium and then from calcium hydride and then stored over calcium hydride. Absolute dryness of the solvent is essential to good yields.

A 500 ml. reaction flask equipped with a reflux condenser was first flushed with nitrogen for 5 minutes and the subsequent reaction was carried out under a nitrogen atmosphere. To the flask were then added 250 ml. of a solvent mixture consisting of 75% tetrahydrofuran and 25% diethylene glycol dimethyl ether. A small lump (about 25 mg.) of lithium aluminum hydride was added to the solvent with slow stirring. After the lithium aluminum hydride had been in contact with the solvent for 15 minutes, a large crystal (about 250 mg.) of iodine was added. When the iodine had completely dissolved, 31.3 g. (0.67 mole) of calcium hydride (−100 mesh) were added to the flask under vigorous stirring. This was followed by the slow addition over 10 to 15 minutes of 17.8 g. (0.067 mole) of aluminum chloride. Stirring of the mixture was maintained during the remainder of the reaction. The iodine color disappeared shortly after the addition of the first part of aluminum chloride ($Al_2Cl_6$), indicating that the reaction was in progress. The reaction mixture heated up considerably and a slow reflux began. The reaction mixture was then heated with a heating mantle. After approximately 15 minutes, vigorous refluxing occurred and it was necessary to cool the mixture momentarily by means of a damp rag.

When the refluxing had subsided, the mixture was again heated and kept under a slow reflux for about one hour until the formation of calcium aluminum hydride.

The calcium aluminum hydride thus obtained can be employed as a reducing agent for aldehydes, ketones, acid chlorides. In this example it will be noted that an excess of calcium hydride was used and this excess calcium hydride can be used in reduction of phosphorus trichloride.

*Example 2*

Under certain circumstances it may be advantageous to add the aluminum chloride prior to the calcium hydride, the order of addition may be changed as follows:

The solvent mixture of 75% tetrahydrofuran and 25% diethylene glycol dimethyl ether was added to the flask. The lithium aluminum hydride was then added to the solvent with slow stirring. After the lithium aluminum hydride had been contacted with the solvent for 15 minutes, the aluminum chloride was added slowly to the reaction mixture. After the aluminum chloride had completely dissolved, the iodine was added, followed by the addition of calcium hydride. In accordance with this procedure the calcium hydride must also be added slowly. The reaction is continued for about one hour to form calcium aluminum hydride.

*Example 3*

For purposes where an excess of calcium hydride is not utilizable, the calcium aluminum hydride may be prepared by either of the above procedures using a 4 to 1 ratio of calcium hydride to aluminum chloride ($Al_2Cl_6$). The amounts used which resulted in 70 to 80% yields were 18.7 g. (0.4 mole based on 90% purity) of calcium hydride and 26.7 g. (0.1 mole) of aluminum chloride ($Al_2Cl_6$). The reaction using these proportions is similar to that using the 10:1 except that it is ordinarily less vigorous, and cooling is usually not required.

*Example 4*

The majority of yields mentioned in Examples 1, 2 and 3 were determined by titrations of the reaction mixtures with a freshly prepared standard solution of iodine in tetrahydrofuran to a yellow color. The reaction may be indicated graphically as follows:

$$Ca(AlH_4)_2 + 4I_2 \rightarrow CaI_2 + Al_2I_6 + 4H_2$$

Iodine reacts instantly with calcium aluminum hydride, but only very slowly with excess calcium hydride, so that a sharp-end point can be obtained; the color gradually fades on standing.

It should be understood that various changes may be made in the present process as herein described without affecting the results attained. Thus, various modifications of conditions as to time, temperature, alkalinity, acidity, etc. and various changes in procedure differing from those herein given as illustrative of the preferred embodiments of this invention may be made without departing from the scope thereof. Accordingly, the scope of the invention is to be determined in accordance with the prior art and appended claims.

We claim:

1. The process for producing calcium aluminum hydride which comprises reacting in one stage aluminum chloride and calcium hydride in a solvent mixture of tetrahydrofuran and diethylene glycol dimethyl ether in the presence of a catalyst of a metal aluminum hydride and iodine, and maintaining the mixture at reflux temperature to form calcium aluminum hydride.

2. The process for producing calcium aluminum hydride which comprises reacting in one-stage aluminum chloride and calcium hydride in a mole ratio of calcium hydride to aluminum chloride in the range of 1.1 up to 40:1 in a solvent mixture of tetrahydrofuran and diethylene glycol dimethyl ether in the presence of a catalyst of lithium aluminum hydride and iodine and maintaining the mixture at reflux temperature to form calcium aluminum hydride.

3. The process of claim 2 wherein the mole ratio of calcium hydride to aluminum chloride is 10:1.

References Cited in the file of this patent

UNITED STATES PATENTS

| | | |
|---|---|---|
| 2,550,985 | Finholt | May 1, 1951 |
| 2,900,224 | Hinckley et al. | Aug. 18, 1959 |

FOREIGN PATENTS

| | | |
|---|---|---|
| 760,774 | Great Britain | Nov. 7, 1956 |

OTHER REFERENCES

Schwab et al.: "Zeitschrift für Naturforschung," vol. 8b, pp. 690–1, 1953.

Brown et al.: "Journal of the American Chemical Society," vol. 77, page 3164 (1955).

"The Preparation of Sodium and Calcium Aluminum Hydrides," by A. E. Finholt et al., J. Inorganic and Nuclear Chemistry, 1955, vol. 1, pp. 317–325.

"The Preparation and Properties of Calcium Aluminum Hydride, $Ca(AlH_4)_2$," by W. Schwab et al., Z. Naturforsch, 8b, 690–1, 1953, abstracted translation available in C/A, 5012g, vol. 48, 1954.